W. J. BAUER.
VEHICLE WHEEL.
APPLICATION FILED FEB. 8, 1909.

944,309.

Patented Dec. 28, 1909.
3 SHEETS—SHEET 1.

Witnesses:

Inventor:
William J. Bauer

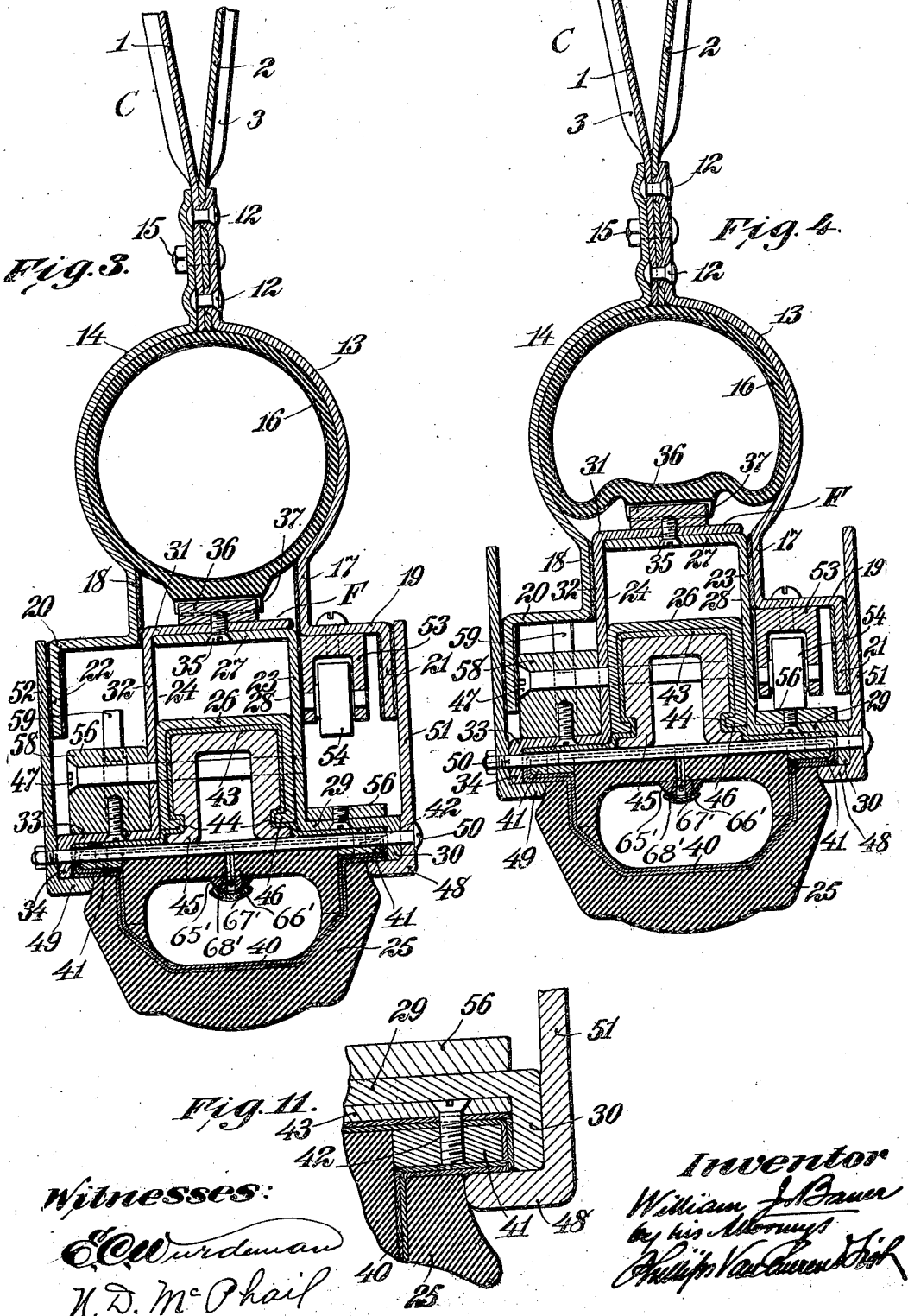

W. J. BAUER.
VEHICLE WHEEL.
APPLICATION FILED FEB. 8, 1909.
944,309.
Patented Dec. 28, 1909.
3 SHEETS—SHEET 3.
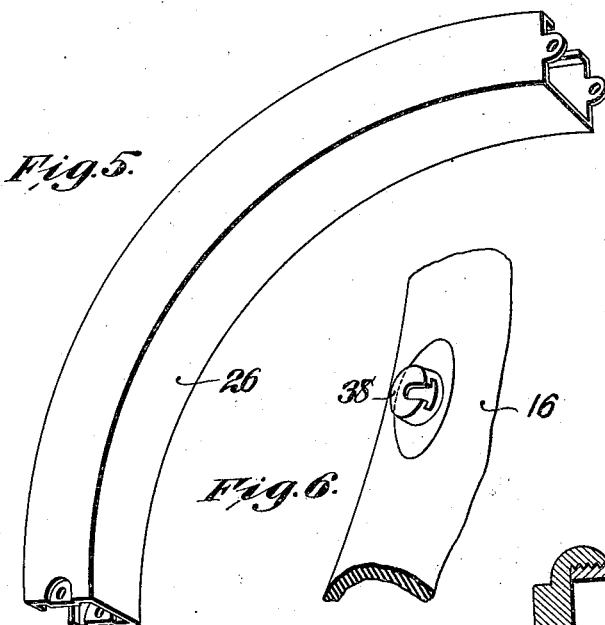
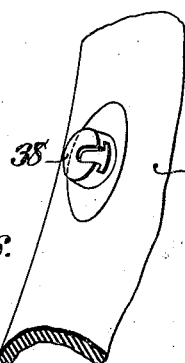
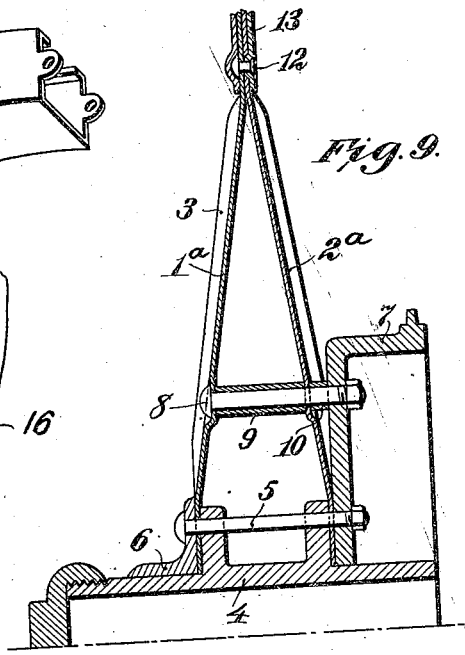
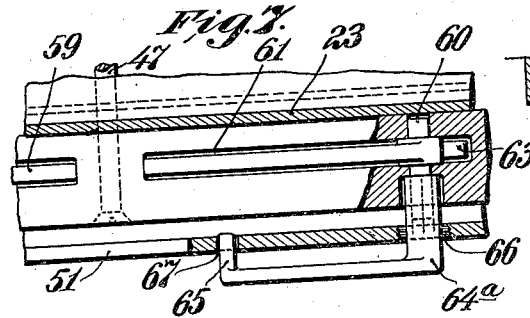
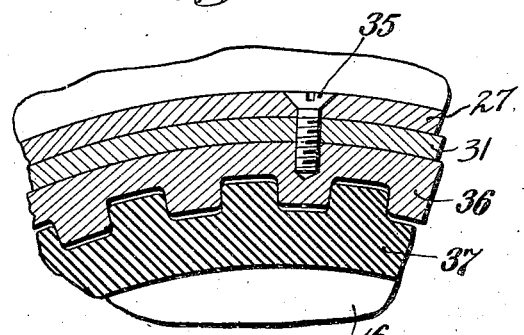
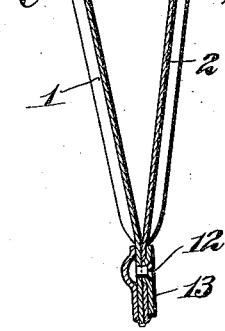
Witnesses:
Inventor:

ptf
UNITED STATES PATENT OFFICE.

WILLIAM J. BAUER, OF NEW YORK, N. Y., ASSIGNOR TO BAUER NON-COLLAPSIBLE WHEEL COMPANY, OF NEW YORK, N. Y., A CORPORATION OF NEW YORK.

VEHICLE-WHEEL.

944,309.  Specification of Letters Patent.  Patented Dec. 28, 1909.

Application filed February 8, 1909. Serial No. 476,624.

*To all whom it may concern:*

Be it known that I, WILLIAM J. BAUER, a citizen of the United States, residing at New York, in the county of New York and State of New York, have invented certain new and useful Improvements in Vehicle-Wheels; and I do hereby declare the following to be a full, clear, and exact description of the invention, such as will enable others skilled in the art to which it appertains to make and use the same.

This invention relates to an improvement in vehicle wheels, the object of which is to produce a wheel of a high elasticity and resiliency, and at the same time to secure strength and durability.

A further object of this invention is to provide a vehicle tire so constructed as to automatically regain its normal condition should the pneumatic tube, which forms part of my invention, become deflated.

Another feature of my invention comprises automatically operating latches which act to lock the rim and the center of my improved wheel together.

Figure 1:
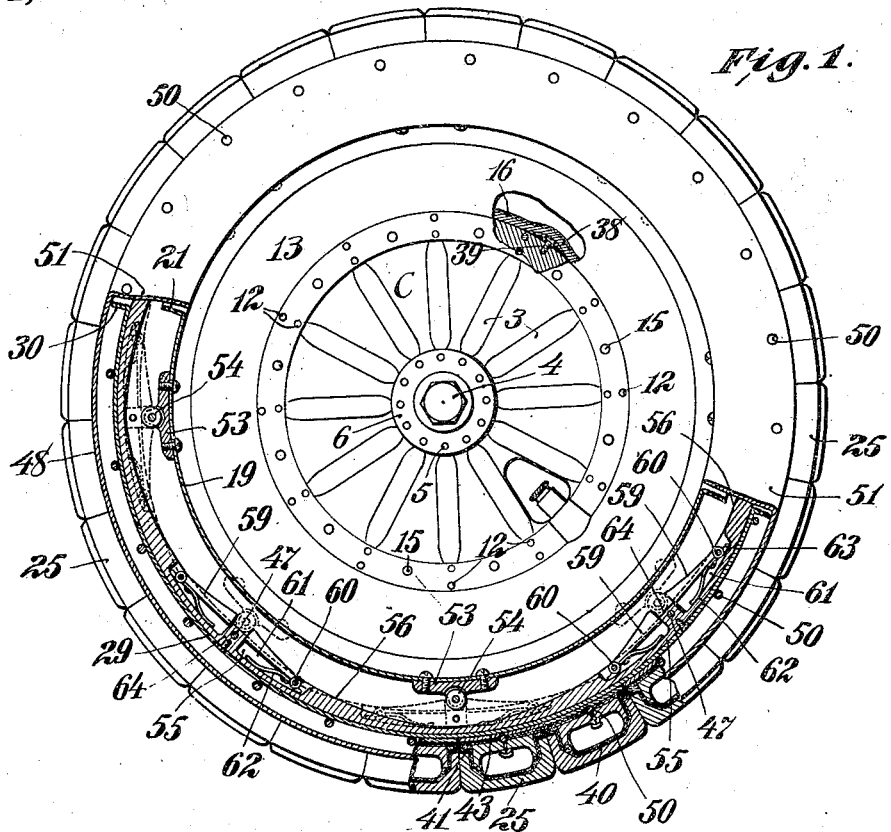
Figure 2:
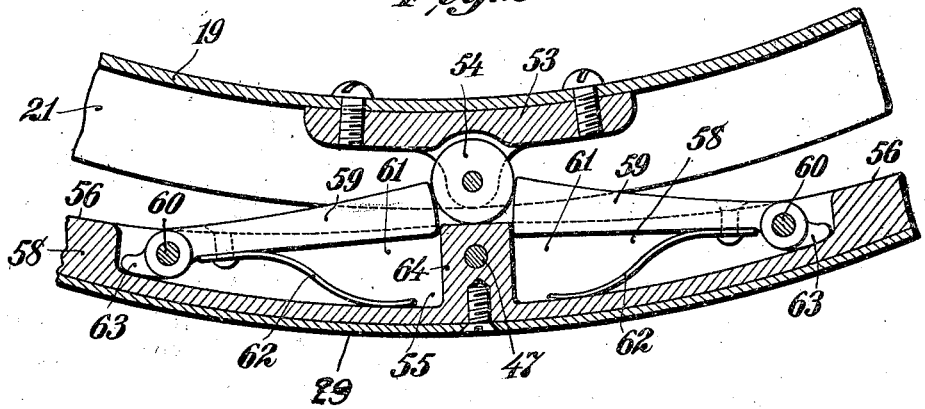

I will now proceed to describe my invention the novel features of which I will finally claim, reference being had to the accompanying drawings, forming part hereof, wherein, Figure 1 is a side elevation of my improved wheel partly in section; Fig. 2 is an enlarged fragmentary sectional elevation illustrating the locking mechanism; Fig. 3 is a transverse section of the outer portion of the wheel center and felly, the parts being shown in the position which they occupy when the pneumatic tube is inflated; Fig. 4 is a similar view showing the parts in the position which they occupy when the pneumatic tube is deflated; Fig. 5 is a perspective view of one of the tread carriers; Fig. 6 is a perspective detail view showing the lug by which the pneumatic tube is secured to the wheel center; Fig. 7 is a horizontal sectional view illustrating the device for unlocking the locking means; Fig. 8 is a sectional elevation of a portion of the felly and pneumatic tube on an enlarged scale; Fig. 9 is a section of the wheel center as adapted for use on the traction wheels of automobiles; Fig. 10 is a similar view showing the wheel center as adapted for use on the front wheels of automobiles; Fig. 11 is a detail sectional view showing a portion of one of the treads and associated parts.

Referring to the drawings my improved wheel comprises two principal parts, a center member or hub portion C and an outer or tire member. The center member consists of two convex disks 1 and 2 with their concave sides toward each other, formed of sheet steel, and provided with spoke-like corrugations or ribs 3 (Fig. 10). These disks are secured to the hub 4 by bolts 5 and angle-irons 6.

In Fig. 9 is shown the construction of a rear or driving wheel provided with a sprocket wheel and brake-drum 7 carried by the disks $1^a$ and $2^a$. The sprocket wheel and brake-drum 7 is secured to the wheel proper by bolts 8 passing through the wheel from face to face, a distance tube 9 being inserted between the two disks $1^a$ and $2^a$ and a distance washer 10 being inserted between the surface of the disk $2^a$ and the sprocket wheel and brake-drum 7.

In Fig. 10 is shown a sectional view of a front wheel, in which two angle-irons 11 are employed on the opposite faces of the wheel.

The two disks 1 and 2 at their edges are riveted together by rivets 12, which also serve to secure the fixed tube-clamp 13 thereto, as seen in Fig. 3. On the opposite side of the wheel the removable tube-clamp 14 is secured by means of the bolts 15. These tube clamps embrace and protect a pneumatic tube 16, which, being inclosed within the clamps therefor, is preserved from injury except such as is due to its movement on itself in use.

The outer portions of the tube-clamps 13 and 14 have outwardly extending flanges 17 and 18 respectively. At the ends of these flanges are formed laterally extending shoulders 19 and 20 respectively. These shoulders bear at their ends outwardly extended flanges 21 and 22 respectively. The tube-clamps constitute both a tube support and a felly support. The center member of the wheel, therefore, comprises the hub and the two convex disks secured together with their concave sides toward each other, carrying at their periphery tube-clamps having portions adapted to engage and support the felly.

The felly F consists of two independent members 23 and 24, which together form the felly. To these felly members 23 and 24 are secured twenty-four independent treads 25, for engagement with the road. A number of the treads are carried by each of the tread carriers 26 for the sake of convenience in removal and replacement of the treads. The felly member 23 consists of a circular piece of metal having a cylindrical base portion 27, a flange portion 28, a shoulder portion 29, and a peripheral flange 30. The other felly member 24 comprises a corresponding cylindrical base portion 31, a flange portion 32, a shoulder portion 33, and a peripheral flange 34. The two felly members are secured together by means of screws 35, which pass through holes in the cylindrical base portions 27 and 31 of the felly members 23 and 24, and screw into the rack members 36. This rack 36 engages teeth 37 on the exterior of the pneumatic tube 16. These teeth keep the felly F from creeping, with relation to the center C. To remove all possibility of creeping, the tube 16 is provided with holders 38, (see Fig. 6) which take onto catches 39 on the inside of the fixed tube-embracing member 13.

Proceeding now to a description of the details of the construction of the felly and its associated parts, the treads will first be described. The treads, indicated in a general way by the reference character 25, are made of rubber, such as is ordinarily used in the manufacture of pneumatic tire shoes. It is provided in its center with an air space. It is molded in parts, assembled and vulcanized. After being vulcanized it is inflated with air and sealed, in a well-known manner. Two layers of reinforcing canvas 40 are incorporated in each tread, which serve to secure the rubber portion of the tread to a rectangular frame which is adapted to extend around the lower edge of the tread. The frames are each provided with four screw-threaded holes, one at each corner, which are adapted to receive screws 42, (see Fig. 11) which pass through holes in the holding frames 43, for the treads 25, and by means of which each tread is secured to its holding plate. These holding plates 43 are curved to correspond with the curvature of the felly, and are of the same length as their corresponding treads, and are provided with a pocket adapted to receive the fillers 45. The frames 43 are provided as at 44 with beads adapted to take into the filler 45 as shown, whereby the said treads and fillers are held together. The frames 43 are provided with outwardly extending flanges to which the treads are secured as hereinbefore described. The outer sides of the beads 44 form grooves which receive the inturned flanges 46 of the tread carrier 26. A plurality of treads are assembled on one of the tread carriers and all are put in place on the felly of the wheel at one time. The tread carriers are secured to the felly by means of the bolts 47. These bolts, it will be observed, simply serve to hold the tread carriers and felly together for purposes of assembling and taking down. They do not serve to transmit any of the strains incident to use.

Clencher rings are employed for securing the treads in place on the felly. These clencher rings 48 and 49 are secured in place by means of bolts 50 which extend from side to side through the flanges 30 and 34 of the felly. One of these bolts 50 is provided for each tread. These clencher rings 48 and 49 are provided with inwardly extended flanges 51 and 52 which extend over the flanges 21 and 22 of the tube-clamps 13 and 14. These flanges 51 and 52 prevent the access of dirt to the locking mechanisms hereinafter referred to. The clencher rings are independent of the tread carriers and operate to hold the treads on the felly. The flanges 30 and 34 of the felly members hold the treads from lateral displacement. The felly directly bears the strains incident to use of the wheel—the tread carriers bear none of these strains.

In case of the rupture of the pneumatic tube 16 and its elimination as a means for supporting the felly member, there are provided locking devices which come into operation and cause the wheel to become a practically solid wheel with the exception of the resilience which is due to the treads. In the absence of the construction to which reference is here made, the tire would be subjected to a very considerable movement of the felly on the center, which I desire to avoid, especially in order to prevent the wear incident to such extraordinary use.

Secured to each of the shoulders 19 and 20 of the tube clamp members 13 and 14 are four brackets 53, each bearing a roller 54. These brackets normally occupy a position with relation to the felly member such as is shown in Figs. 1 and 3. Opposite these rollers on the felly members are provided latches 59, between each pair of which are surfaces 56 upon which the rollers are adapted to roll when the pneumatic tube 16 becomes deflated, the said surfaces being concentric with the felly when the tube 16 is inflated.

In the position in which the parts are shown in Fig. 1, the surfaces 56 are at their greatest distance from the rollers 54, so as to permit the greatest relative movement of the felly and wheel center without the engagement of the rollers with the surfaces 56, thereby permitting the greatest relative movement of the felly and wheel center. The surfaces 56 are formed upon the inner surface of the latch carriers 58 which are secured to the inside of the shoulders or flange portions 29 and 33 of the felly members 23 and 24. Each latch carrier 58 is provided with four sets of latches, one of which is illustrated in Fig. 2. These latches consist of two pawls 59 having pintles 60 by which they are pivoted to the catch carriers 58. Cavities 61 in the catch carriers afford provision for the depression of the pawls below the level of the surfaces 56 of the latch carriers when a roller rolls thereover. These pawls are normally held in the position shown in Fig. 2 by means of springs 62. The pawls are prevented from moving outward farther than to the position illustrated in Fig. 2 by means of the stops 63 formed thereon.

In the ordinary operation of the wheel, the rack member 36 and the pneumatic tube are locked together by means of their cooperating teeth and recesses, and the rollers normally occupy a position between the sets of latches illustrated in Fig. 1 in full lines. When the pneumatic tube is deflated, it fails to support the felly in its outer position, as illustrated in Fig. 3, and thereupon the felly is forced into the position shown in Fig. 4, at which time the lower rollers 54 come into contact with the surfaces 56, opposite thereto, of the catch carriers 58.

Referring to Fig. 1 it will be seen that the treads 25, which form the tire of my improved wheel, are concentric with the center C of the wheel; this condition exists when the pneumatic tube 16 is inflated. When the felly F and the center C of the wheel are in their normal position relative to each other, when the tube 16 is inflated, each roller 54 will be opposite a depression in the catch carrier 58, the said catch carrier being carried by the felly F. The depression referred to comprises the depressed surface 56.

By referring to Fig. 1 it will be seen that the rollers 54 are staggered; that is to say, half of the said rollers are carried by the tube-clamp 13 and the other half of said rollers are carried by the tube-clamp 14, (see Figs. 3 and 4).

As long as the tube 16 remains inflated the rollers 54 will remain as shown in Fig. 1. Should the tube 16 become deflated the wheel center C will drop and fall into a position eccentric to the tire of the wheel. When the wheel center drops, the under roller, and the roller adjacent thereto, will drop into the depressions, opposite thereto, in the catch carrier 58. The continued rotation of the center C will cause the rollers 54 to ride up the inclines at each end of the said depressions and to travel around until they, the said rollers, strike one of the latches 59. (See Fig. 2). When the rollers 54 strike the latches 59 the latches will become depressed thereby allowing the rollers to pass onwardly until they reach the rest 64. When the rollers 54 have reached the rests 64 they will contact the opposite latches 59 as shown in Fig. 2, and thereby allow the latch 59, first named, to be forced upwardly by its spring to a position behind the rollers 54. When the said rollers 54 have reached the positions above named they will be contacted at opposite points by the latches 59, whereby the rollers will be held in a pocket and against movement independently of the tire.

While it is true that the under rollers 54 will drop, when the tube 16 becomes deflated, toward the tire, it is also true that the upper rollers will do the same, but when the under rollers ride up the inclines leading from the depressions they will force the wheel-center back to its concentric position and each of the rollers will finally become locked between its own pair of latches 59.

When the tube 16 becomes deflated and the transmitting connection between it and the felly has been destroyed to a certain degree, the wheel-center will revolve independently of the felly F should the rack connection between the said tube and rack 37 be destroyed. When the center C comes down upon the catch carrier 58 it will force the treads 25 firmly against the ground and even though the rollers 54 are traveling up the incline and toward the adjacent pair of latches 59 this pressure will still exist, and while the tire may get a slight rotation from the continued forward movement of the vehicle it will not prevent the rotation of the center C sufficiently to cause the rollers 54 to be engaged by the latches 59 as hereinbefore described.

When the pneumatic tube 16 has become deflated and the locks have been brought into operation and it is desired to replace the tube with a new tube, the clencher ring 49 and clamp 14 will be removed and the deflated tube may be taken out. With the parts in this condition, and before replacing the pneumatic tube 16 with another tube, the wheel should be restored to its condition prior to the puncture, that is to say, the locks should be released and the felly should be turned on the center until the rollers again occupy the position illustrated in Fig. 1. The locks accessible by the removal of the clencher ring 49 and clamp member 14 can be operated by hand. The locks on the other side may be operated without the removal of the clencher ring by means of keys or wrenches 64$^a$ which are applied to the squared ends of the pintles 60 and then turned to depress the pawl, whereupon the tail 65 of the key will be thrust into a hole 67 in the flange 51 to hold the pawl in the unlocked position, thereby permitting the rotation of the felly on the wheel center. The flange 51 is provided with holes 66 for the key center to pass through, and with holes 67 for the tail of the key to engage.

Repairs may be made on this wheel in the minimum of time and with the minimum of expense. In case the pneumatic tube 16 bursts, it may readily be replaced by removing the nuts of the bolts 50 and the nuts of the bolts 15, so as to enable the removable tube-clamp to be taken off. In case one of the treads should become worn to an extent making it desirable to replace it with another, the nuts on the bolts 50 are taken off and the two clencher rings are taken off; then the two screws 47 at each end of the tread carrier 26 which is carrying the tread desired to be removed, are withdrawn, and this tread carrier is then taken off. Thereupon the treads are slipped off of the tread carrier, the injured or worn one is replaced by a new one, and the tread carrier is again put in place, the screws 47 reinserted, the clencher rings replaced, and the clencher bolts 50 secured, and the wheel is again ready for use. The economy of replacing a single tread is obvious.

It may here be stated that should a tube become deflated and the wheel-center and rim become automatically locked, as hereinbefore described, the wheel will in no way become unfit for use as a wheel excepting that it will have less resiliency.

Referring to Figs. 3 and 4 the numeral 65' indicates a rubber seat against which a valve 66' is cemented after the tread 25 has been inflated. It will, of course, be understood that during the process of inflating the treads the duct 67' will contain the nozzle of a suitable inflating device, and the valve 66' will be out of contact with the seat 65'. When the treads 25 have been inflated to the desired extent and as the nozzle of the inflating device is withdrawn, the valve 66' will be drawn against the seat 65' by a cord 68', which is sufficiently long to extend considerably beyond the inner surface of the tread. Each tread 25 will be provided with the above mentioned device.

Having now described my invention what I claim and desire to secure by Letters Patent is—

1. A driving vehicle wheel comprising a hub section, a rim section, means to prevent the relative sidewise movement of the sections, a pneumatic cushion arranged between the sections, a locking device carried by the rim section, and means carried by the hub section adapted to interlock with the locking device on the rim section when the pneumatic cushion becomes deflated during rotation of the wheel under load.

2. A driving vehicle wheel comprising a hub section, a rim section, means to prevent the relative sidewise movement of the sections, a pneumatic cushion arranged between the sections, a plurality of latches carried by the rim section, and a plurality of rollers carried by the hub section adapted to interlock with the latches on the rim section when the pneumatic cushion becomes deflated during the rotation of the wheel under load.

3. A driving vehicle wheel comprising a hub section, an independent rim section, a pneumatic cushion arranged between said sections normally adapted to keep said sections in a concentric relationship one with the other, and means adapted to restore said hub section to its concentric relationship with the rim section, should the pneumatic cushion become deflated during rotation of the wheel under load, to interlock and bind said sections together.

4. A driving vehicle wheel comprising a hub section, an independent rim section, a pneumatic cushion arranged between said sections, normally adapted to keep said sections in a concentric relationship one with the other, and means adapted to restore said hub section to its concentric relationship with the rim section, should the pneumatic cushion become deflated during rotation of the wheel under load, and to cause said sections to rotate in unison after the said hub section has been restored to its normal position.

5. A driving vehicle wheel, comprising a hub section, clamps carried by said hub section, said clamps being provided at the periphery thereof with outwardly extending flanges, a pneumatic tube carried by said clamps, a felly retained by said clamps and adapted for movement therebetween, a tread carried by said felly, clencher rings adapted to retain said tread in position on said felly, said clencher rings being adapted to contact the flanges on said clamps, whereby a dust-proof guard is formed, a rack carried by said felly and teeth carried by said pneumatic tube adapted to mesh with the teeth of said rack.

6. A driving vehicle wheel comprising a hub section, clamps carried by said hub section, said clamps being provided at the periphery thereof with outwardly extending flanges, a pneumatic tube carried by said clamps, a felly retained by said clamps and adapted for movement therebetween, a tread carried by said felly, latches carried by said felly, means carried by the flanges on said clamps adapted to interlock with said latches when the pneumatic tube becomes deflated during rotation of the wheel under load, a rack carried by said felly and teeth carried by said tube adapted to intermesh with said rack.

7. A driving vehicle wheel, comprising a hub section, clamps carried by said hub section, said clamps being provided at the periphery thereof with outwardly extending flanges, a pneumatic tube carried by said clamps, a felly retained by said clamps adapted for movement therebetween, a tread carried by said felly, a frame adapted to secure said tread to said felly, a filler carried by said frame, a rack carried by said felly, teeth carried by said pneumatic tube adapted to mesh with said rack, latches carried by said felly, and means carried by said clamps adapted to engage said latches when said tube becomes deflated during rotation of the wheel under load.

8. A driving vehicle wheel, comprising a hub section, clamps carried by said hub section, said clamps being provided at the periphery thereof with outwardly extending flanges, a pneumatic tube carried by said clamps, a felly retained by said clamps adapted for movement therebetween, a tread carried by said felly, a frame adapted to secure said tread to said felly, a filler carried by said frame, a rack carried by said felly, teeth carried by said pneumatic tube adapted to mesh with said rack, latches carried by said felly, and rollers carried by said clamps adapted to engage said latches when said tube becomes deflated during rotation of the wheel under load In testimony whereof I affix my signature, in presence of two witnesses.

WILLIAM J. BAUER.

Witnesses:
 HORACE VAN EVEREN,
 ALICE ACKROYD.